(12) United States Patent
Park et al.

(10) Patent No.: US 11,007,861 B2
(45) Date of Patent: May 18, 2021

(54) DOUBLE CLUTCH APPARATUS FOR HYBRID ELECTRIC VEHICLE

(71) Applicants: HYUNDAI MOTOR COMPANY, Seoul (KR); KIA MOTORS CORPORATION, Seoul (KR)

(72) Inventors: Juhyeon Park, Gyeongsangnam-do (KR); Seong Wook Hwang, Gunpo-si (KR); Jae Young Jeon, Osan-si (KR); Dongwoo Gwak, Hwaseong-si (KR); Seongeun Yun, Bucheon-si (KR); Wonmin Cho, Hwaseong-si (KR); Bong Hyun Cho, Gunpo-si (KR); Seongwook Ji, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/695,462

(22) Filed: Nov. 26, 2019

(65) Prior Publication Data

US 2021/0094404 A1    Apr. 1, 2021

(30) Foreign Application Priority Data

Sep. 30, 2019  (KR) .......................... 10-2019-0120376

(51) Int. Cl.
*B60K 6/387*  (2007.10)
*F16D 21/06*  (2006.01)
(Continued)

(52) U.S. Cl.
CPC .............. *B60K 6/387* (2013.01); *F16D 13/52* (2013.01); *F16D 21/06* (2013.01); *F16D 25/0638* (2013.01); *F16D 25/12* (2013.01)

(58) Field of Classification Search
CPC .. B60K 6/387; B60K 6/48; B60K 2006/4825; F16D 21/06; F16D 2021/0661;
(Continued)

(56) References Cited

U.S. PATENT DOCUMENTS

2011/0290610 A1* 12/2011 Arnold ............... F16D 25/0638
                                                        192/48.1
2015/0083546 A1*  3/2015 Moser .................... F16D 23/14
                                                         192/41 R
(Continued)

FOREIGN PATENT DOCUMENTS

EP       2287487 A1 *  2/2011  .............. B60K 6/48
KR    10-1459777 B1    11/2014

*Primary Examiner* — Charles A Fox
*Assistant Examiner* — Farhana Pervin
(74) *Attorney, Agent, or Firm* — Brinks Gilson & Lione

(57) ABSTRACT

A double clutch apparatus for a hybrid electric vehicle having a motor and an engine includes: first and second clutches transmitting a motor torque and an engine torque to first and second input shafts; and first and second slave cylinders disposed at a transmission case and configured to respectively operate the first and second clutches in an axial direction. In particular, a rotor hub of the motor is rotatably supported by an end of a radially interior side of a front cover, and is connected to the first input shaft through a clutch retainer of the second clutch and a first connection member to transmit the motor torque to the first input shaft. In addition, the first and second clutches are disposed in parallel in an interior circumference of the rotor hub to selectively transmit the engine torque to the first and second input shafts, respectively.

9 Claims, 6 Drawing Sheets

(51) Int. Cl.
*F16D 25/12* (2006.01)
*F16D 25/0638* (2006.01)
*F16D 13/52* (2006.01)

(58) Field of Classification Search
CPC ...... F16D 25/12; F16D 25/0638; F16D 13/52; F16K 60/40; F16K 6/48; F16K 2006/4825
See application file for complete search history.

(56) References Cited

U.S. PATENT DOCUMENTS

2018/0313411 A1* 11/2018 Satoyoshi ............ B60L 15/2054
2019/0271362 A1* 9/2019 Lorenz ................... H02K 7/108
2020/0164733 A1* 5/2020 Hauck .................... B60K 6/387

* cited by examiner

DOUBLE CLUTCH APPARATUS FOR HYBRID ELECTRIC VEHICLE

CROSS-REFERENCE TO RELATED APPLICATION

This application claims priority to and the benefit of Korean Patent Application No. 10-2019-0120376, filed on Sep. 30, 2019, the entire contents of which are incorporated herein by reference.

FIELD

The present disclosure relates to a double clutch apparatus for a hybrid electric vehicle.

BACKGROUND

The statements in this section merely provide background information related to the present disclosure and may not constitute prior art.

Environment-friendly technology in vehicles is a core technology of a future automobile industry, and automakers are focusing on developing environment-friendly vehicles to satisfy environmental and fuel efficiency regulations.

An electric vehicle (EV) and a hybrid electric vehicle (HEV) that utilize electrical energy, and a double clutch transmission (DCT) improving fuel efficiency and convenience may be examples of future vehicle technologies.

The hybrid electric vehicle is a vehicle using two or more power sources that may be combined in various schemes, and typically, a gasoline or diesel engine using fossil fuels and a motor/generator driven by electric energy are combined to act as the power sources.

The DCT alternatingly activates odd-numbered shift-stages and even-numbered shift-stages by alternatingly operating two clutches, and thereby improves continuity in torque transmission.

We have discovered that applying a double clutch transmission (DCT) to the hybrid electric vehicle (HEV) increases fuel efficiency and maximize fuel efficiency, and we have fond that an efficient combination of the DCT and the HEV can be accomplished by modularizing a double clutch apparatus and an engine clutch together with the motor of the hybrid electric vehicle.

The above information disclosed in this Background section is only for enhancement of understanding of the background of the present disclosure and therefore it may contain information that does not form the prior art that is already known to a person of ordinary skill in the art.

SUMMARY

An exemplary double clutch apparatus is for a hybrid electric vehicle including a motor, an engine having an engine output shaft, and a transmission defining an axial direction. The double clutch apparatus may include: first and second clutches selectively transmitting a torque of the motor and the engine output shaft to first and second input shafts of the transmission, and first and second slave cylinders disposed at a transmission case and configured to respectively operate the first and second clutches in the axial direction. A rotor hub of the motor may be rotatably supported by a bearing and a supporting end formed on a radially interior side of a front cover, and the rotor hub is connected to the first input shaft through a clutch retainer of the second clutch and a first connection member, so as to continuously transmit the torque of the motor to the first input shaft. The first and second clutches may be disposed in parallel in a radial direction in an interior circumference of the rotor hub and configured to selectively transmit the torque of the engine to the first and second input shafts, respectively.

An exterior circumference of the engine output shaft may be rotatably supported by an interior circumference of the supporting end of the front cover and a bearing. An interior end of the engine output shaft may be fixed to a first clutch hub of the first clutch.

The first clutch may include: a plurality of first clutch plates spline-engaged with a spline portion formed at the interior circumference of the rotor hub, a first clutch hub disposed in parallel with the interior circumference of the rotor hub and including an interior circumferential end fixed to the engine output shaft, a plurality of first clutch disks alternatingly disposed between the plurality of first clutch plates, spline-engaged with an exterior circumference of the first clutch hub, and supported in the axial direction by a first reaction plate disposed on the spline portion of the rotor hub, a first clutch piston disposed in a radially interior side of the rotor hub to partially penetrate the clutch retainer of the second clutch and configured to operate the plurality of first clutch plates and the plurality of first clutch disks under an operation of a first slave cylinder, and a plurality of first return springs disposed in the axial direction between the first clutch piston and the clutch retainer of the second clutch and providing a restoring force to the first clutch piston.

A stroke of the first clutch piston may be limited by a stop ring fixed to an exterior circumference of the clutch retainer of the second clutch.

The second clutch may include: a clutch retainer disposed in parallel with an interior circumference of the first clutch hub and having an exterior circumference spline-engaged with the spline portion of the rotor hub, a plurality of second clutch plates spline-engaged with an interior circumference of the clutch retainer, a second clutch hub disposed in parallel with the interior circumference of the clutch retainer, a plurality of second clutch disks alternatingly disposed between the plurality of second clutch plates, spline-engaged with an exterior circumference of the second clutch hub, and supported in the axial direction by the clutch retainer, a second clutch piston disposed in a radially interior side of the first clutch piston and operating the plurality of second clutch plates and the plurality of second clutch disks by the second slave cylinder, a first connection member fixed to the interior circumferential end of the clutch retainer and having an interior circumference teeth-engaged with the first input shaft, and a second connection member fixed to the interior circumferential end of the second clutch hub and having an interior circumference teeth-engaged with the second input shaft.

The respective teeth engagement with the first and second input shafts may be a spline-engagement or a serration engagement.

The second clutch may include a plurality of second return springs disposed along the axial direction between the second clutch piston and a corresponding spring retainer and providing a restoring force to the second clutch piston.

A radially exterior end of the spring retainer may be spline-engaged with the interior circumference of the clutch retainer, and a radially interior end of the spring retainer may be rotatably disposed on an exterior circumference of the second connection member and a bearing.

The second connection member may be rotatably supported by the first connection member and a bearing.

The engine output shaft may be rotatably supported by a bearing interposed between the supporting end of the front cover and the first connection member respectively.

According to an exemplary embodiment of the present disclosure, first and second clutches are disposed in parallel in the radial direction in a radially interior side of the rotor hub of the motor to share parts, thereby reducing the number of required parts and also reducing an overall weight and length of a transmission.

Due to a reduction of the overall length of the transmission, a turbo-charged engine, a large displacement engine, or a large capacity motor may be installed in an engine compartment for a high performance vehicle, by enhanced layout of the vehicle.

Since double slave cylinders are applied to operate the first and second clutches to achieve a closed-type hydraulic pressure system, thereby reducing or minimizing oil loss or leakage, and thereby improving power delivery efficiency of a transmission.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
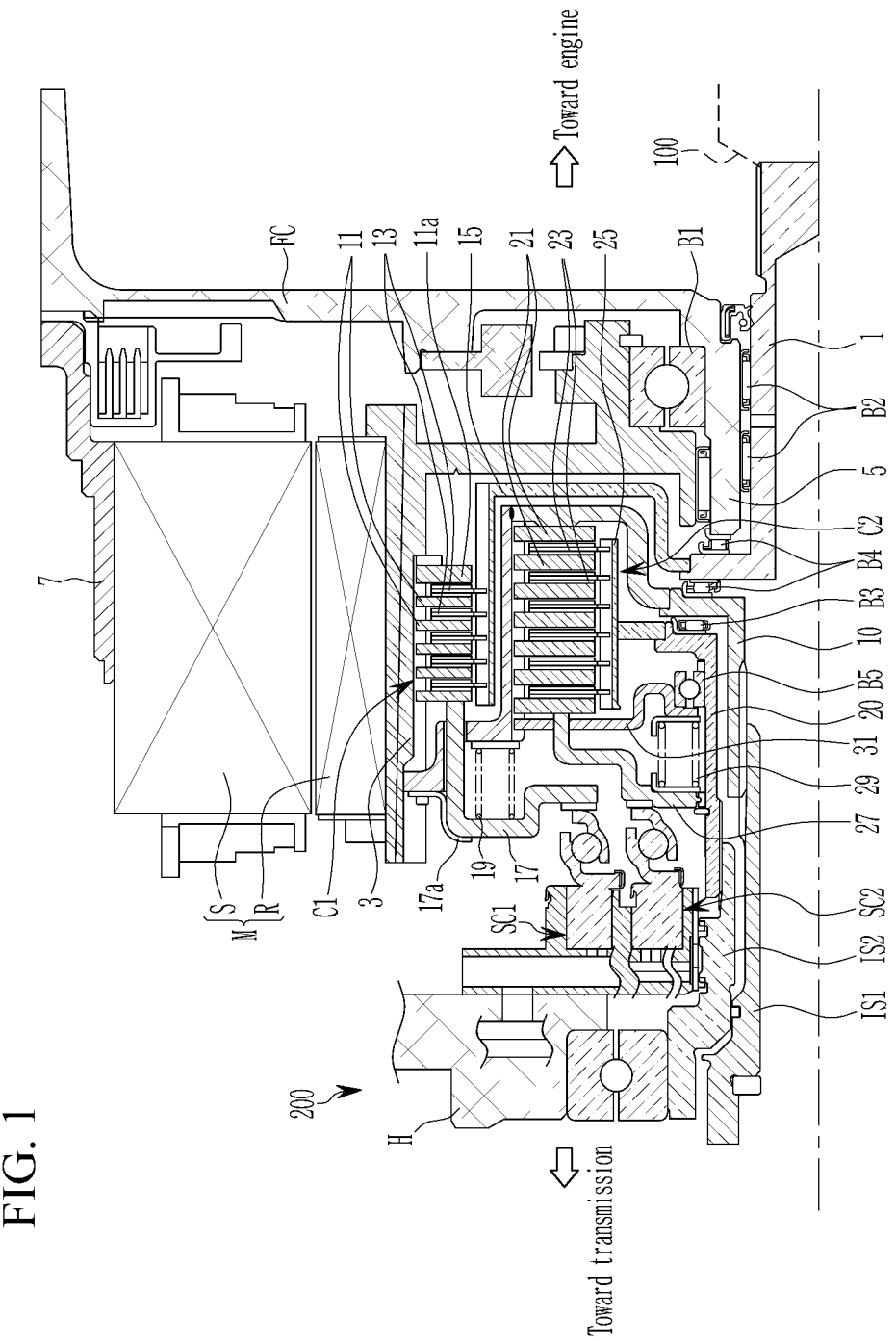
FIG. 1 is a cross-sectional view of an exemplary double clutch apparatus for a hybrid electric vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

An exemplary embodiment of the present disclosure will hereinafter be described in detail with reference to the accompanying drawings.

In the following description, dividing names of components into first, second and the like is to divide the names because the names of the components are the same as each other and an order thereof is not particularly limited.

Figure 2:
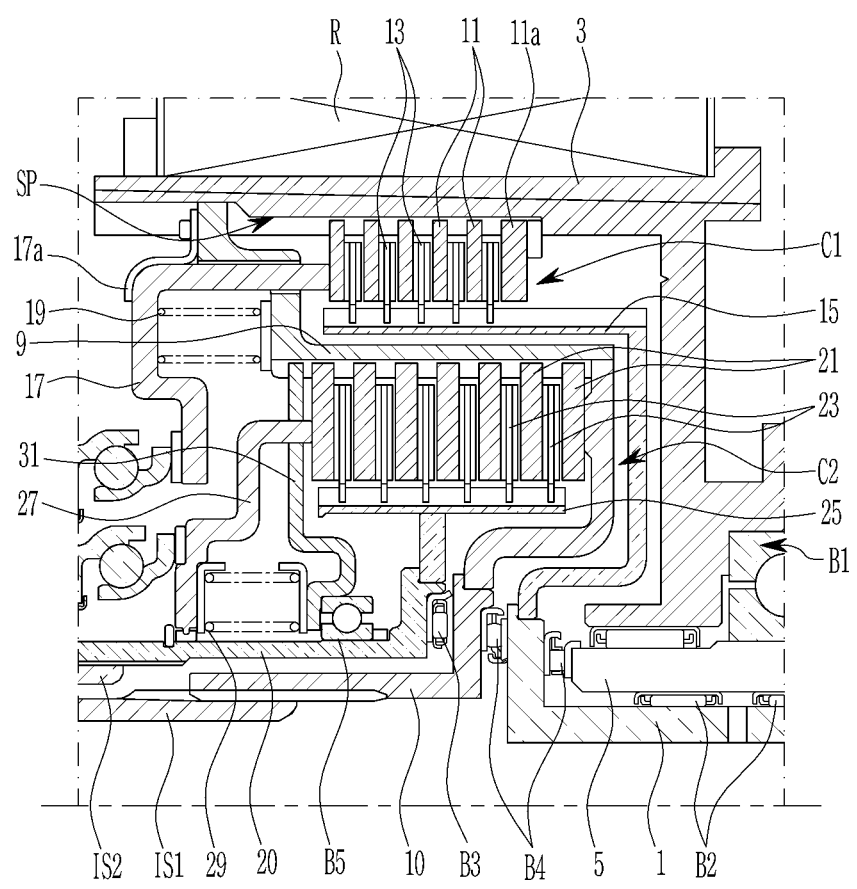
FIG. 2 is an enlarged view of an exemplary double clutch apparatus for a hybrid electric vehicle.

FIG. 1 is a cross-sectional view of an exemplary double clutch apparatus for a hybrid electric vehicle, and FIG. 2 is an enlarged view of an exemplary double clutch apparatus for a hybrid electric vehicle.

Referring to FIG. 1 and FIG. 2, an exemplary double clutch apparatus for a hybrid electric vehicle receives a torque of a motor M (i.e., a motor/generator) and also a torque of an engine 100 through an engine output shaft 1 (which may be a damper output shaft). The double clutch apparatus selectively transmits the received torque to a shifting device (e.g., a transmission) 200 through selective connection with two input shafts IS1 and IS2 through two clutches C1 and C2.

The motor M includes a rotor R and a stator S and may act as a motor and a generator, as in an electric vehicle.

The rotor R is rotatably supported by a supporting end 5 formed at a radially interior side of a front cover FC through a rotor hub 3. The stator S is fixed to the front case FC through a support ring 7.

That is, the rotor hub 3 is rotatably supported by the supporting end 5 of the front cover FC. In more detail, an interior circumferential end of the rotor hub 3 is rotatably supported by the supporting end 5 of the front cover FC via a bearing B1 interposed therebetween.

The rotor hub 3 is surrounded by an interior circumference of the rotor R and thus the rotor R is rotatably supported by the supporting end 5 of the front cover FC through the rotor hub 3.

The two input shafts include first and second input shafts IS1 and IS2. The first input shaft IS1 transmits a torque to the transmission 200. The second input shaft IS2 is disposed coaxially with and exterior to the first input shaft IS1 without rotational interference, and transmits a torque to the transmission 200.

The double clutch apparatus includes first and second clutches C1 and C2 and first and second slave cylinders SC1 and SC2.

According to the operation of the first and second slave cylinders SC1 and SC2, the first and second clutches C1 and C2 may selectively transmit the torque of the engine 100 to the first and second input shafts IS1 and IS2. According to the operation of the second slave cylinder SC2, the second clutch C2 may selectively transmit the torque of the motor M to the second input shaft IS2.

An exemplary double clutch apparatus is hereinafter described in further detail with reference to the drawings.

As shown in FIG. 1 and FIG. 2, the first and second clutches C1 and C2 are disposed in a radially interior portion of the rotor hub 3, in parallel in the radial direction.

The rotor hub 3 of the motor M is rotatably supported by the supporting end 5 of the radially interior side of the front cover FC. The rotor hub 3 is surrounded by an interior circumference of the rotor R of the motor M and thus receives the torque of the motor M.

A spline portion SP is formed at the interior circumference the rotor hub 3, and therefore, the rotor hub 3 may also act as a clutch retainer for the first clutch C1, without employing a separate clutch retainer.

That is, the first clutch C1 includes the rotor hub 3 that acts as a clutch retainer, and a first reaction plate 11a and a plurality of first clutch plates 11 are spline-engaged with the spline portion SP formed at the Interior circumference of the rotor hub 3.

A first clutch hub 15 is disposed in parallel with the Interior circumference of the rotor hub 3. An interior circumferential end of the first clutch hub 15 is welded to the engine output shaft 1 and always receives the torque of the engine 100.

A plurality of first clutch disks 13 are alternatingly disposed between a plurality of first clutch plates 11. The plurality of first clutch disks 13 are spline-engaged with an exterior circumference of the first clutch hub 15, and supported in the axial direction by the first reaction plate 11a disposed on the spline portion SP of the rotor hub 3.

A first clutch piston 17 is disposed in the radially interior side of the rotor hub 3. The first clutch piston 17 partially penetrates a clutch retainer 9 of the second clutch C2, and movable in the axial direction by the first slave cylinder SC1.

That is, under the operation of the first slave cylinder SC1, the first clutch piston 17 engages or disengages the first clutch plates 11 and the first clutch disks 13.

A plurality of first return springs 19 are disposed along the axial direction between the first clutch piston 17 and the clutch retainer 9 of the second clutch C2 to provide a restoring force to the first clutch piston 17.

A stroke of the first clutch piston 17 may be limited by a stop ring 17a fixed to the clutch retainer 9 of the second clutch C2.

An exterior circumference of the engine output shaft 1 is rotatably supported by the interior circumference of the supporting end 5 of the front cover FC via a bearing B2 interposed therebetween. An interior end of the engine output shaft 1 is welded to the first clutch hub 15 of the first clutch C1.

The second clutch C2 includes the clutch retainer 9. The clutch retainer 9 is disposed in parallel with the interior circumference of the first clutch hub 15. An exterior circumference of the clutch retainer 9 is spline-coupled with the spline portion SP of the rotor hub 3.

An interior circumferential end of the clutch retainer 9 is welded to a first connection member 10 teeth-engaged with the exterior circumference of the first input shaft IS1.

A plurality of second clutch plates 21 are spline-engaged with the interior circumference of the clutch retainer 9.

A second clutch hub 25 is disposed in parallel with the interior circumference of the clutch retainer 9. An interior circumferential end of the second clutch hub 25 is welded to a second connection member 20 teeth-engaged with the exterior circumference of the second input shaft IS2.

The teeth engagement between the first and second connection members 10 and 20 and the first and second input shafts IS1 and IS2 may be respectively spline-engagement or serration engagement, where interior circumferences of the first and second connection members 10 and 20 are coupled with exterior circumferences of the first and second input shafts IS1 and IS2.

The second connection member 20 may be rotatably supported by the first connection member 10 via a bearing B3 interposed therebetween. The engine output shaft 1 may be rotatably supported by the supporting end 5 of the front cover FC and the first connection member 10 via one or more bearings B4 interposed therebetween.

A plurality of second clutch disks 23 are alternatingly disposes between the plurality of second clutch plates 21. The plurality of second clutch disks 23 are spline-engaged with the exterior circumference of the second clutch hub 25, and are supported in the axial direction by the clutch retainer 9.

A second clutch piston 27 is disposed in a radially interior side of the first clutch piston 17.

The second clutch piston 27 is movable in the axial direction by the second slave cylinder SC2.

That is, under the operation of the second slave cylinder SC2, the second clutch piston 27 engages or disengages the second clutch plates 21 and the second clutch disks 23.

A plurality of second return springs 29 are disposed along the axial direction between the second clutch piston 27 and the spring retainer 31 to provide a restoring force to the second clutch piston 27.

A radially exterior end of the spring retainer 31 is spline-engaged with the interior circumference of the clutch retainer 9. A radially interior end of the spring retainer 31 is rotatably mounted on the exterior circumference of the second connection member 20 by interposing a bearing B5 therebetween.

When the first and second clutches C1 and C2 rotate in a released state, the first and second return springs 19 and 29 may form a gap between the clutch plates 11 and 21 and the clutch disks 13 and 23, thereby reducing or minimizing a drag loss of the friction members.

The first and second slave cylinders SC1 and SC2 may be formed at a transmission case H, and may operate the first and second clutch pistons 17 and 27 of the first and second clutches C1 and C2 in the axial direction through cylinder rods.

The first and second slave cylinders SC1 and SC2 are rotatably supported by the first and second clutch pistons 17 and 27 and a bearing respectively. The first and second slave cylinders SC1 and SC2 may be disposed in a double concentric slave cylinder (CSC) arrangement.

The engine output shaft 1 is coaxially disposed with the first and second input shafts IS1 and IS2 and selectively connected to the rotor hub 3 through the first clutch C1 to selectively transmit the torque of the engine 100. Therefore, the first clutch C1 may act as an engine clutch.

FIG. 3 to FIG. 6 respectively illustrate an operation state of an exemplary double clutch apparatus for a hybrid electric vehicle.

Referring to FIG. 3 to FIG. 6, an operation of the above exemplary double clutch apparatus is hereinafter described.

Figure 3:
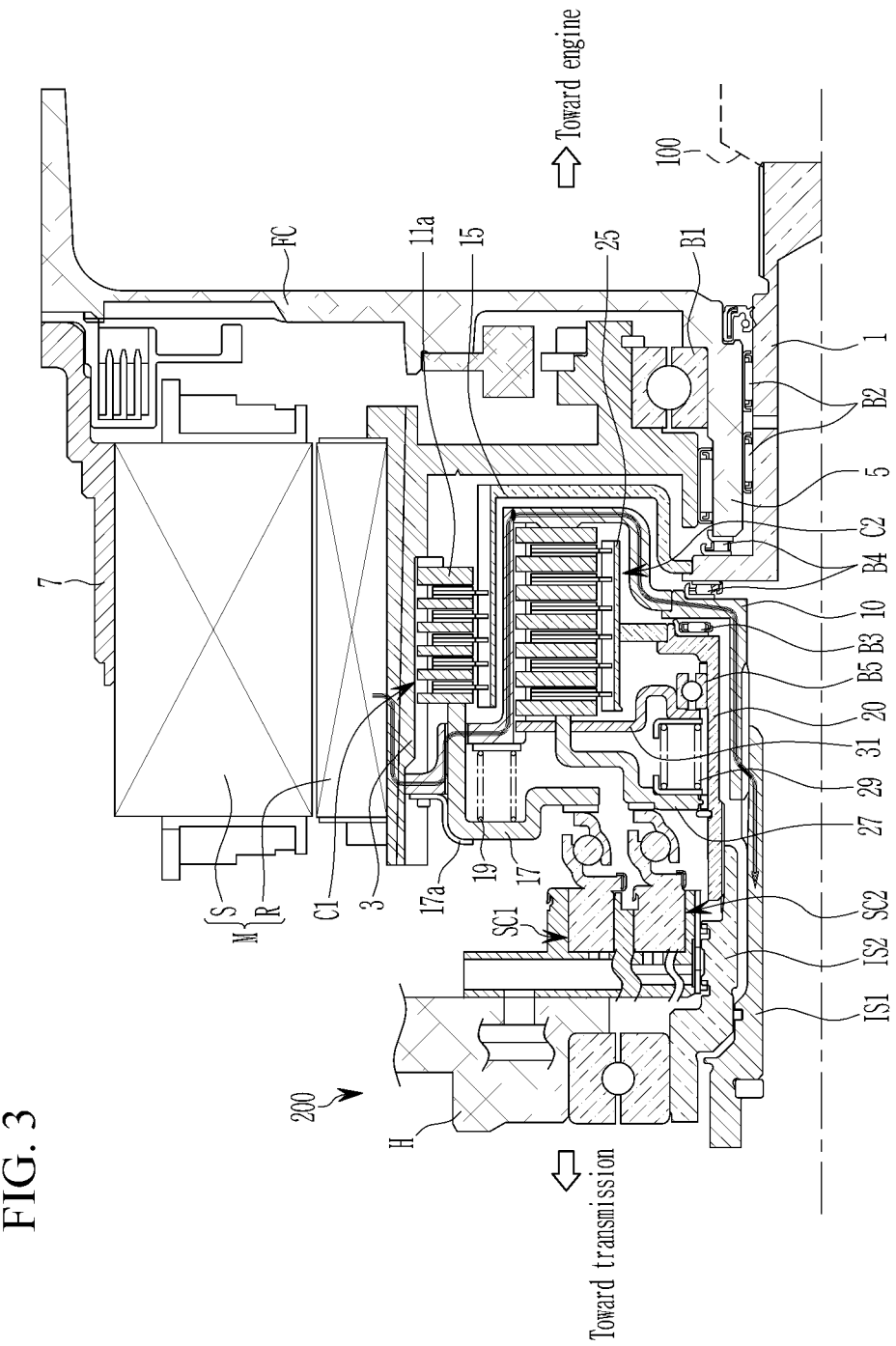
FIG. 3 to FIG. 6 respectively illustrate an operation state of an exemplary double clutch apparatus for a hybrid electric vehicle.

Referring to FIG. 3, when the first and second clutches C1 and C2 are not operated, the torque of the motor M is input to the first input shaft IS1.

The torque of the motor M is transmitted consecutively through the rotor hub 3, the clutch retainer 9 of the second clutch C2, the first connection member 10, and the first input shaft IS1.

Figure 4:
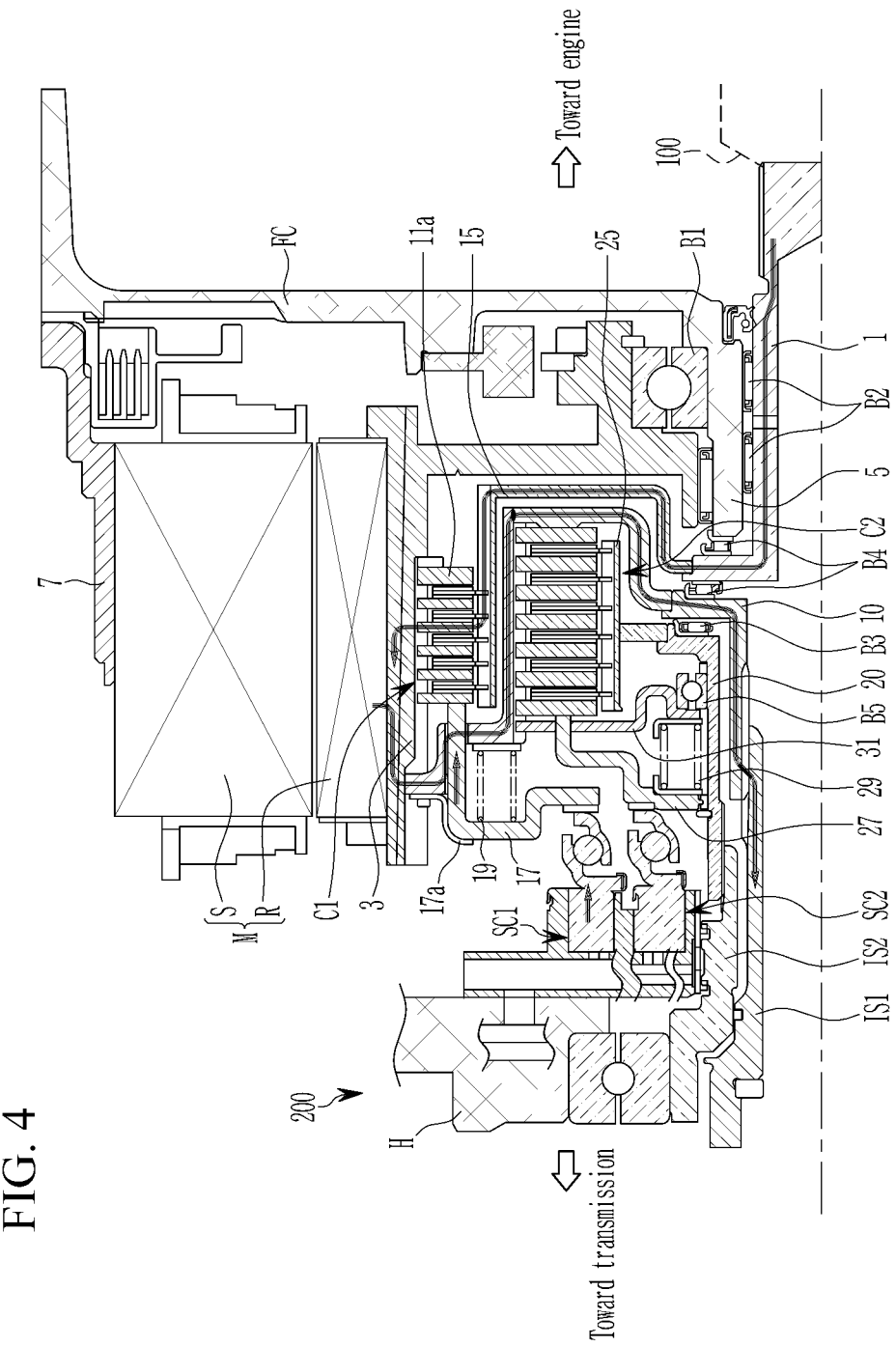

Referring to FIG. 4, when only the first clutch C1 is operated, while the torque of the motor M is always input to the first input shaft IS1 as illustrated in FIG. 3, the torque of the engine 100 is transmitted to the rotor hub 3 consecutively through the engine output shaft 1, the first clutch hub 15, the first clutch disk 13, and the first clutch plate 11, and is therefore delivered to the first input shaft IS1 together with the torque of the motor M.

That is, when only the first clutch C1 is operated, the torques of the motor M and the engine 100 are transmitted to the first input shaft IS1.

Figure 5:
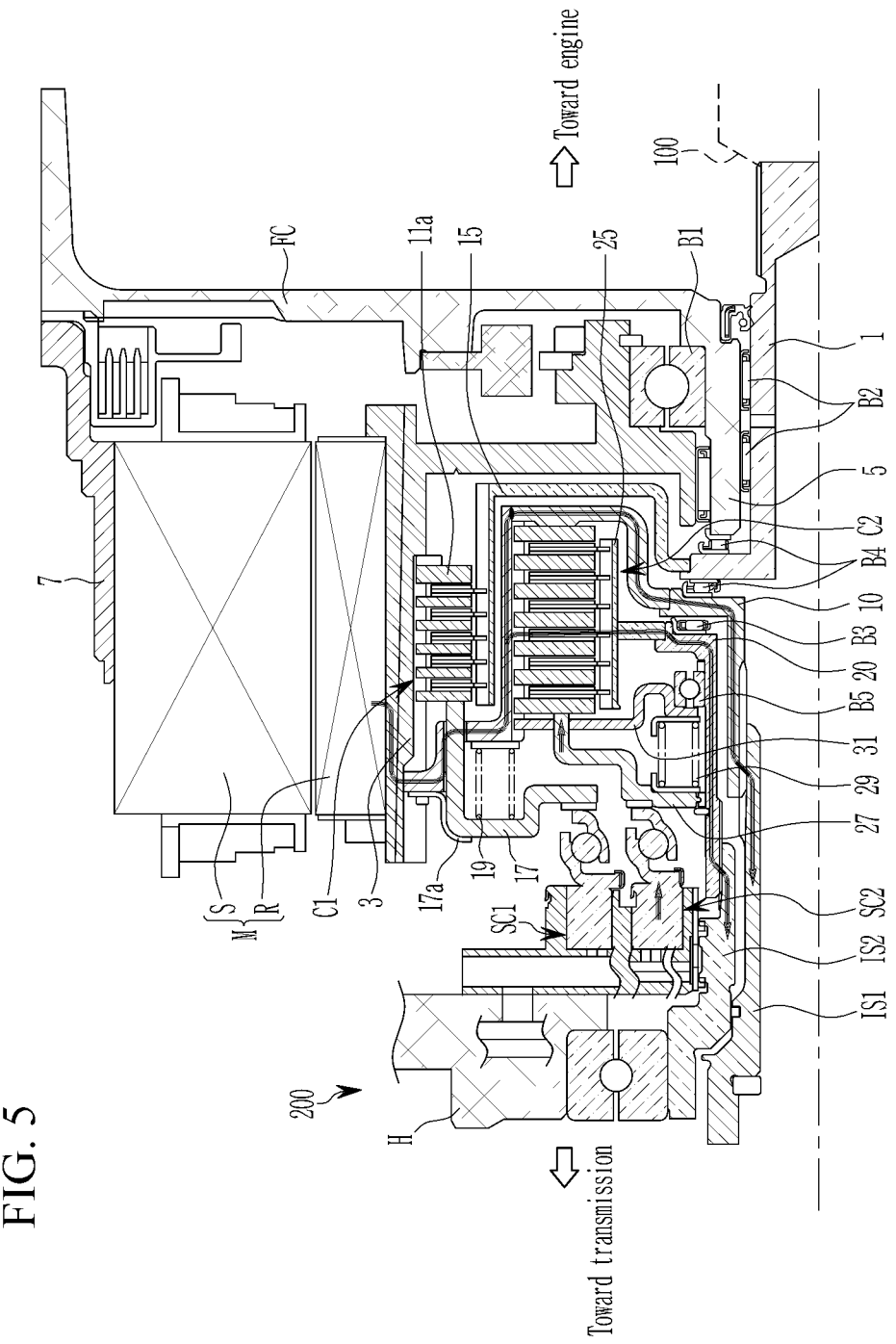

Referring to FIG. 5, when only the second clutch C2 is operated, while the torque of the motor M is always input to the first input shaft IS1 as illustrated in FIG. 3, the torque of the motor M is transmitted consecutively through the rotor hub 3, the clutch retainer 9 of the second clutch C2, the second clutch plate 21, the second clutch disk 23, the second clutch hub 25, the second connection member 20, and the second input shaft IS2.

That is, when only the second clutch C2 is operated, the torque of the motor M is simultaneously transmitted to the first and second input shafts IS1 and IS2.

Figure 6:
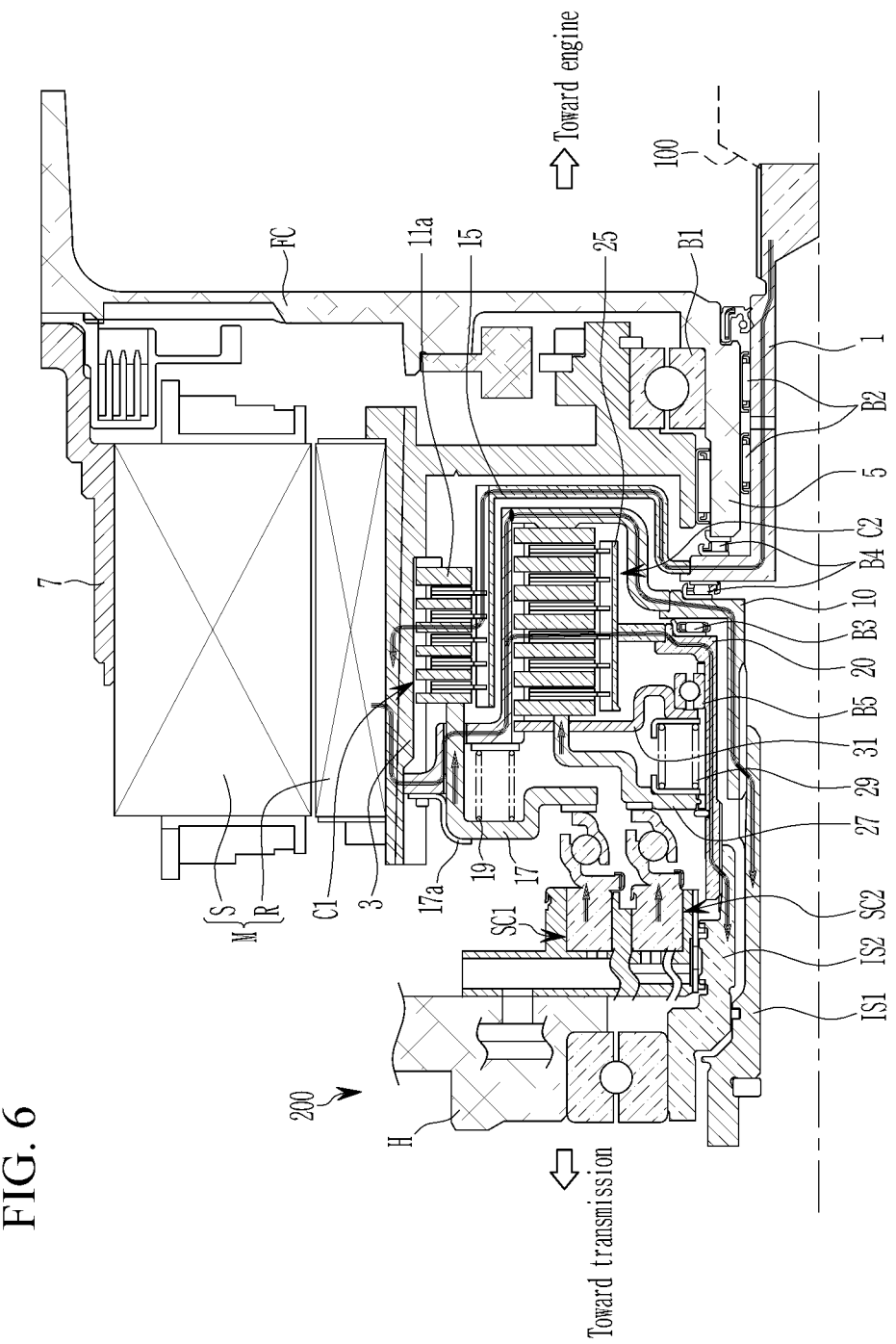

Referring to FIG. 6, when the first and second clutches C1 and C2 are simultaneously operated, while the torque of the motor M is always input to the first input shaft IS1 as illustrated in FIG. 3, the torque of the engine 100 is transmitted to the rotor hub 3 consecutively through the engine output shaft 1, the first clutch hub 15, the first clutch disk 13, and the first clutch plate 11, and is therefore delivered to the first input shaft IS1 together with the torque of the motor M. At the same time, the torques of the motor M and the engine 100 is transmitted consecutively through the rotor hub 3, the clutch retainer 9 of the second clutch C2, the second clutch plate 21, the second clutch disk 23, the second clutch hub 25, the second connection member 20, and the second input shaft IS2.

That is, when the first and second clutches C1 and C2 are simultaneously operated, the torques of the motor M and the engine 100 are simultaneously transmitted to the first and second input shafts IS1 and IS2.

According to an exemplary double clutch apparatus for a hybrid electric vehicle, first and second clutches C1 and C2 are disposed in parallel in the radial direction in a radially interior side of the rotor hub 3 of the motor M to share parts, thereby reducing the number of required parts.

Since first and second clutches C1 and C2 may be disposed in parallel in the radial direction in a radially interior side of the rotor R of the motor M, an overall length of the transmission may be reduced.

Due to a reduction of the overall length of the transmission, a turbo-charged engine, a large displacement engine, or a large capacity motor may be installed in an engine compartment for a high performance vehicle.

Since double slave cylinders SC1 and SC2 are applied to operate the first and second clutches C1 and C2 to achieve a closed-type hydraulic pressure system, thereby preventing oil loss or leakage, and thereby improving power delivery efficiency of a transmission.

Since the rotor hub 3 of the motor M is rotatably supported by the supporting end 5 of the front cover FC via a bearing B1 interposed therebetween, a typical support bearing may be eliminated, thereby increasing spatial efficiency of an interior space of the motor M.

While this present disclosure has been described in connection with what is presently considered to be practical exemplary embodiments, it is to be understood that the present disclosure is not limited to the disclosed embodiments. On the contrary, it is intended to cover various modifications and equivalent arrangements included within the spirit and scope of the appended claims.

DESCRIPTION OF SYMBOLS

H: transmission case
H: transmission case
FC: front cover
M: motor (motor/generator)
1: engine output shaft (or damper output shaft)
3: rotor hub
5: supporting end
7: support ring
9: clutch retainer
IS1, IS2: first and second input shafts
C1, C2: first and second clutches
SC1, SC2: first and second slave cylinders
S: stator
R: rotor
B: bearing
10, 20: first and second connection members
11, 21: first and second clutches plates
11a: first reaction plate
13, 23: first and second clutches disks
15, 25: first and second clutches hubs
17, 27: first and second clutch pistons
19, 29: return spring
31: spring retainer

What is claimed is:

1. A double clutch apparatus for a hybrid electric vehicle including a motor, an engine having an engine output shaft, and a transmission defining an axial direction, the double clutch apparatus comprising:
   first and second clutches selectively transmitting a torque of the motor and the engine output shaft to first and second input shafts of the transmission; and
   first and second slave cylinders disposed at a transmission case and configured respectively to operate the first and second clutches in the axial direction,
   wherein a rotor hub of the motor is rotatably supported by a bearing and a supporting end formed on a radially interior side of a front cover, and the rotor hub is connected to the first input shaft through a clutch retainer of the second clutch and a first connection member, so as to continuously transmit the torque of the motor to the first input shaft, and
   wherein the first and second clutches are disposed in parallel in a radial direction in an interior circumference of the rotor hub and configured to selectively transmit the torque of the engine to the first and second input shafts, respectively,
   wherein:
   an exterior circumference of the engine output shaft is rotatably supported by an interior circumference of the supporting end of the front cover and a bearing; and
   an interior end of a first clutch hub of the first clutch is fixed to the engine output shaft.

2. A double clutch apparatus for a hybrid electric vehicle including a motor, an engine having an engine output shaft, and a transmission defining an axial direction, the double clutch apparatus comprising:
   first and second clutches selectively transmitting a torque of the motor and the engine output shaft to first and second input shafts of the transmission; and
   first and second slave cylinders disposed at a transmission case and configured respectively to operate the first and second clutches in the axial direction,
   wherein a rotor hub of the motor is rotatably supported by a bearing and a supporting end formed on a radially interior side of a front cover, and the rotor hub is connected to the first input shaft through a clutch retainer of the second clutch and a first connection member, so as to continuously transmit the torque of the motor to the first input shaft, and
   wherein the first and second clutches are disposed in parallel in a radial direction in an interior circumference of the rotor hub and configured to selectively transmit the torque of the engine to the first and second input shafts, respectively,
   wherein the first clutch comprises:
   a plurality of first clutch plates spline-engaged with a spline portion formed at the interior circumference of the rotor hub;
   a first clutch hub disposed in parallel with the interior circumference of the rotor hub and including an interior circumferential end fixed to the engine output shaft;
   a plurality of first clutch disks alternatingly disposed between the plurality of first clutch plates, spline-engaged with an exterior circumference of the first clutch hub, and supported in the axial direction by a first reaction plate disposed on the spline portion of the rotor hub;
   a first clutch piston disposed in a radially interior side of the rotor hub and configured to partially penetrate the clutch retainer of the second clutch and operate the plurality of first clutch plates and the plurality of first clutch disks under an operation of a first slave cylinder; and a plurality of first return springs disposed in the axial direction between the first clutch piston and the clutch retainer of the second clutch and configured to provide a restoring force to the first clutch piston.

3. The double clutch apparatus of claim 2, wherein a stroke of the first clutch piston limited by a stop ring fixed to an exterior circumference of the clutch retainer of the second clutch.

4. The double clutch apparatus of claim 2, wherein the second clutch comprises:
  a clutch retainer disposed in parallel with an interior circumference of the first clutch hub and having an exterior circumference spline-engaged with the spline portion of the rotor hub;
  a plurality of second clutch plates spline-engaged with an interior circumference of the clutch retainer;
  a second clutch hub disposed in parallel with the interior circumference of the clutch retainer;
  a plurality of second clutch disks alternatingly disposed between the plurality of second clutch plates, spline-engaged with an exterior circumference of the second clutch hub, and supported in the axial direction by the clutch retainer;
  a second clutch piston disposed in a radially interior side of the first clutch piston and configured to operate the plurality of second clutch plates and the plurality of second clutch disks by the second slave cylinder;
  a first connection member fixed to the interior circumferential end of the clutch retainer and having an interior circumference teeth-engaged with the first input shaft; and
  a second connection member fixed to the interior circumferential end of the second clutch hub and having an interior circumference teeth-engaged with the second input shaft.

5. The double clutch apparatus of claim 4, wherein the teeth engagement with the first and second input shafts is a spline-engagement or a serration engagement.

6. The double clutch apparatus of claim 4, wherein the second clutch comprises a plurality of second return springs disposed along the axial direction between the second clutch piston and a corresponding spring retainer and configured to provide a restoring force to the second clutch piston.

7. The double clutch apparatus of claim 6, wherein a radially exterior end of the corresponding spring retainer is spline-engaged with the interior circumference of the clutch retainer, and a radially interior end of the corresponding spring retainer is rotatably disposed on an exterior circumference of the second connection member interposing a bearing.

8. The double clutch apparatus of claim 7, wherein the second connection member is rotatably supported by the first connection member and a bearing.

9. The double clutch apparatus of claim 2, wherein the engine output shaft is rotatably supported by a bearing interposed between the supporting end of the front cover and the first connection member respectively.

* * * * *